(12) United States Patent
Park (10) Patent No.: US 7,613,874 B2
(45) Date of Patent: Nov. 3, 2009

(54) RECORDING MEDIUM, AND A METHOD AND APPARATUS FOR OVERWRITING DATA IN THE SAME

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 743 days.

(21) Appl. No.: 11/249,710

(22) Filed: Oct. 14, 2005

(65) Prior Publication Data

US 2006/0083130 A1    Apr. 20, 2006

Related U.S. Application Data

(60) Provisional application No. 60/618,182, filed on Oct. 14, 2004.

(30) Foreign Application Priority Data

Nov. 11, 2004   (KR) .................. 10-2004-0092018

(51) Int. Cl.
   *G06F 12/00*   (2006.01)
(52) U.S. Cl. .................... 711/111; 369/53.17
(58) Field of Classification Search .............. None
   See application file for complete search history.

(56) References Cited

U.S. PATENT DOCUMENTS

| | | | |
|---|---|---|---|
| 4,558,446 A | 12/1985 | Banda et al. | |
| 4,733,386 A | 3/1988 | Shimoi | |
| 4,807,205 A | 2/1989 | Picard | |
| 4,963,866 A | 10/1990 | Duncan | |
| 5,068,842 A | 11/1991 | Naito | |
| 5,111,444 A | 5/1992 | Fukushima et al. | |
| 5,210,734 A | 5/1993 | Sakurai | |

(Continued)

FOREIGN PATENT DOCUMENTS

CN    1134017    10/1996

(Continued)

OTHER PUBLICATIONS

International Search Report dated Jan. 10, 2007.

(Continued)

*Primary Examiner*—Reginald G Bragdon
*Assistant Examiner*—Baboucarr Faal
(74) *Attorney, Agent, or Firm*—Harness, Dickey & Pierce (57) ABSTRACT

A method for overwriting data in a recording medium includes the steps of assigning a plurality of record areas to the recording medium, and recording the same category data in individual record areas; and performing a replacement record operation at a specific position indicative of a closest writable area, upon receiving an overwrite command, and maintaining the same category data in the record area after performing the replacement record operation. The method for overwriting data in a recording medium includes the steps of assigning at least one Sequential Recording Range (SRR) to the recording medium, and recording data in the assigned SRR; b) upon receiving an overwrite command associated with a pre-recorded area contained in the SRR, performing a replacement record operation in a writable area contained in the SRR; and c) if the writable area is not present in the SRR, performing a replacement record operation in a writable area contained in an adjacent SRR.

20 Claims, 10 Drawing Sheets

U.S. PATENT DOCUMENTS

| | | |
|---|---|---|
| 5,235,585 A | 8/1993 | Bish et al. |
| 5,237,553 A | 8/1993 | Fukushima et al. |
| 5,247,494 A | 9/1993 | Ohmo et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A | 9/1995 | Takano et al. |
| 5,475,820 A | 12/1995 | Natraseveschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,914,928 A | 6/1999 | Takahashi |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 * | 3/2007 | Park et al. ........................ 714/6 |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0033517 A1 | 10/2001 | Ando et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0223427 A1 | 11/2004 | Kim et al. |
| 2004/0246849 A1 | 12/2004 | Hwang et al. |
| 2004/0246851 A1 | 12/2004 | Hwang et al. |
| 2004/0246852 A1 * | 12/2004 | Hwang et al. ............ 369/53.17 |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |

| | | | | | | |
|---|---|---|---|---|---|---|
| 2005/0055500 | A1 | 3/2005 | Park | JP | 2001-110168 | 4/2001 |
| 2005/0060489 | A1 | 3/2005 | Park | JP | 2001-201976 | 7/2001 |
| 2005/0068877 | A1 | 3/2005 | Yeo | JP | 2001-242732 | 9/2001 |
| 2005/0083740 | A1 | 4/2005 | Kobayashi | JP | 2001-318555 | 11/2001 |
| 2005/0083767 | A1 | 4/2005 | Terada et al. | JP | 2001-351334 | 12/2001 |
| 2005/0083830 | A1 | 4/2005 | Martens et al. | JP | 2001-357623 | 12/2001 |
| 2005/0195716 | A1 | 9/2005 | Ko et al. | JP | 2002-015507 | 1/2002 |
| 2005/0207262 | A1 | 9/2005 | Terada et al. | JP | 2002-015525 | 1/2002 |
| 2005/0289389 | A1 | 12/2005 | Yamagami et al. | JP | 2002-050131 | 2/2002 |
| 2006/0077827 | A1 | 4/2006 | Takahashi | JP | 2002-056619 | 2/2002 |
| 2006/0195719 | A1 | 8/2006 | Ueda et al. | JP | 2002-174988 | 6/2002 |
| 2006/0203635 | A1 | 9/2006 | Ko et al. | JP | 2002-215612 | 8/2002 |
| 2006/0203638 | A1 | 9/2006 | Ko et al. | JP | 2002-245723 | 8/2002 |
| 2006/0203684 | A1 | 9/2006 | Ko et al. | JP | 2002-288938 | 10/2002 |
| 2006/0227694 | A1 | 10/2006 | Woerlee et al. | JP | 2002-329321 | 11/2002 |
| 2007/0292175 | A1 | 12/2007 | Shinshi | JP | 2002-352522 | 12/2002 |
| 2007/0294571 | A1 | 12/2007 | Park et al. | JP | 2003-346429 | 12/2003 |
| 2008/0046780 | A1 | 2/2008 | Shibuya et al. | JP | 2004-171714 | 6/2004 |
| 2008/0063443 | A1 | 3/2008 | Yoshinaga et al. | JP | 2004171714 A * | 6/2004 |
| 2008/0112739 | A1 | 5/2008 | Shinshi | JP | 2004-280864 | 10/2004 |
| 2008/0175633 | A1 | 7/2008 | Shinshi | JP | 2004-280865 | 10/2004 |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1675708 | 9/2005 |
| CN | 1685426 | 10/2005 |
| DE | 199 54 054 | 6/2000 |
| EP | 0 428 208 A2 | 5/1991 |
| EP | 0 477 503 | 4/1992 |
| EP | 0 464 811 | 8/1992 |
| JP | 63-091842 | 4/1988 |
| JP | 1-263955 | 10/1989 |
| JP | 2-023417 | 1/1990 |
| JP | 2831369 | 8/1990 |
| JP | 05-173446 | 7/1993 |
| JP | 5-274814 | 10/1993 |
| JP | 06-338139 | 12/1994 |
| JP | 6-349201 | 12/1994 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 10-261286 | 9/1998 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-214718 | 8/2000 |
| JP | 2000-215612 | 8/2000 |
| JP | 2000-285607 | 10/2000 |
| JP | 2001-013805 | 1/2001 |
| JP | 2001-023317 | 1/2001 |
| JP | 2001-066933 | 3/2001 |
| JP | 2001-069440 | 3/2001 |
| JP | 2004-287131 | 10/2004 |
| JP | 2004-303381 | 10/2004 |
| JP | 2005-004912 | 1/2005 |
| JP | 2005-202420 | 7/2005 |
| JP | 2005-538490 | 12/2005 |
| JP | 2005-538491 | 12/2005 |
| JP | 2006-048005 | 2/2006 |
| JP | 2006-519445 | 8/2006 |
| KR | 10-2004-0015602 | 11/2004 |
| TW | 371752 | 10/1999 |
| TW | 413805 | 12/2000 |
| WO | WO 97/17652 | 5/1997 |
| WO | WO 03/025924 | 3/2003 |
| WO | WO 2004/015707 | 2/2004 |
| WO | WO 2004/029968 A2 | 4/2004 |
| WO | WO 2004/086379 | 10/2004 |
| WO | WO 2004/086379 A1 | 10/2004 |

OTHER PUBLICATIONS

"JIS Handbook Data Processing for Hardware," Japanese Standards Association Inc., Japan, Apr. 21, 1999, pp. 1064-1070, with English translation thereof of Mar. 4, 2008.

International Search Report and Written Opinion dated Aug. 31, 2004.

International Search Report and Written Opinion dated Jan. 13, 2006.

International Search Report and Written Opinion dated Mar. 8, 2007.

Search Report for corresponding European Application No. 07110035.8 dated Jun. 5, 2008.

Office Action for corresponding Russian Application No. 2006104619/28 dated Jun. 26, 2008.

European Search Report corresponding to European Application No. 05792965.5 dated Dec. 5, 2008.

European Search Report corresponding to European Application No. 04748387.0 dated Jan. 21, 2009.

Takashi Yokozeki et al. "A Virtual Optical Disk Method to Realize Rewritability and Revision Control on A Write-Once Optical Disk", Systems & Computers in Japan, Wiley, Hoboken, NJ, US vol. 21, No. 8, Jan. 1, 1990.

Office Action for Japanese patent application No. 2007-057630 dated Jul. 10, 2009 (with English translation).

Search Report for European patent application No. 09159176.8 dated Jul. 1, 2009.

* cited by examiner

LOW on the Closed SRR N

=> Closed SRR number(N) % number of open SRRs ex) closed SRR : 0, 1, 2, 3 (closed SRR 0, 2 : FS data, closed SRR 1, 3 : User data) open SRR : 4, 5

=> List of Open SRR[0] = 4,  List of Open SRR[1] = 5

LOW on closed SRR 0 = 0 % 2 = 0 -> LOW on open SRR[0] = 4 -> Open SRR 4에 mapping (FS data)

LOW on closed SRR 1 = 1 % 2 = 1 -> LOW on open SRR[1] = 5 -> Open SRR 5에 mapping (User data)

LOW on closed SRR 2 = 2 % 2 = 0 -> LOW on open SRR[0] = 4 -> Open SRR 4에 mapping (FS data)

LOW on closed SRR 3 = 3 % 2 = 1 -> LOW on open SRR[1] = 5 -> Open SRR 5에 mapping (User data)

RECORDING MEDIUM, AND A METHOD AND APPARATUS FOR OVERWRITING DATA IN THE SAME

This application claims the benefit of U.S. Provisional Application No. 60/618,182, filed on Oct. 14, 2004, in the name of inventors Yong Cheol, PARK, entitled "REPLACEMENT RULES FOR LOW", which is hereby incorporated by reference as if fully set forth herein.

This application claims the benefit of Korean Patent Application No. 10-2004-0092018, filed on Nov. 11, 2004, which is hereby incorporated by reference as if fully set forth herein.

BACKGROUND OF THE INVENTION

1. Field of the Invention

The present invention relates to a recording medium, and more particularly to a method and apparatus for performing a logical overwrite function when recording data in the recording medium.

2. Discussion of the Related Art

Generally, there has recently been developed a recording medium capable of recording high-quality video data and high-quality audio data for a long period of time, for example, a Blu-ray Disc Rewritable (BD-RE).

Figure 1:
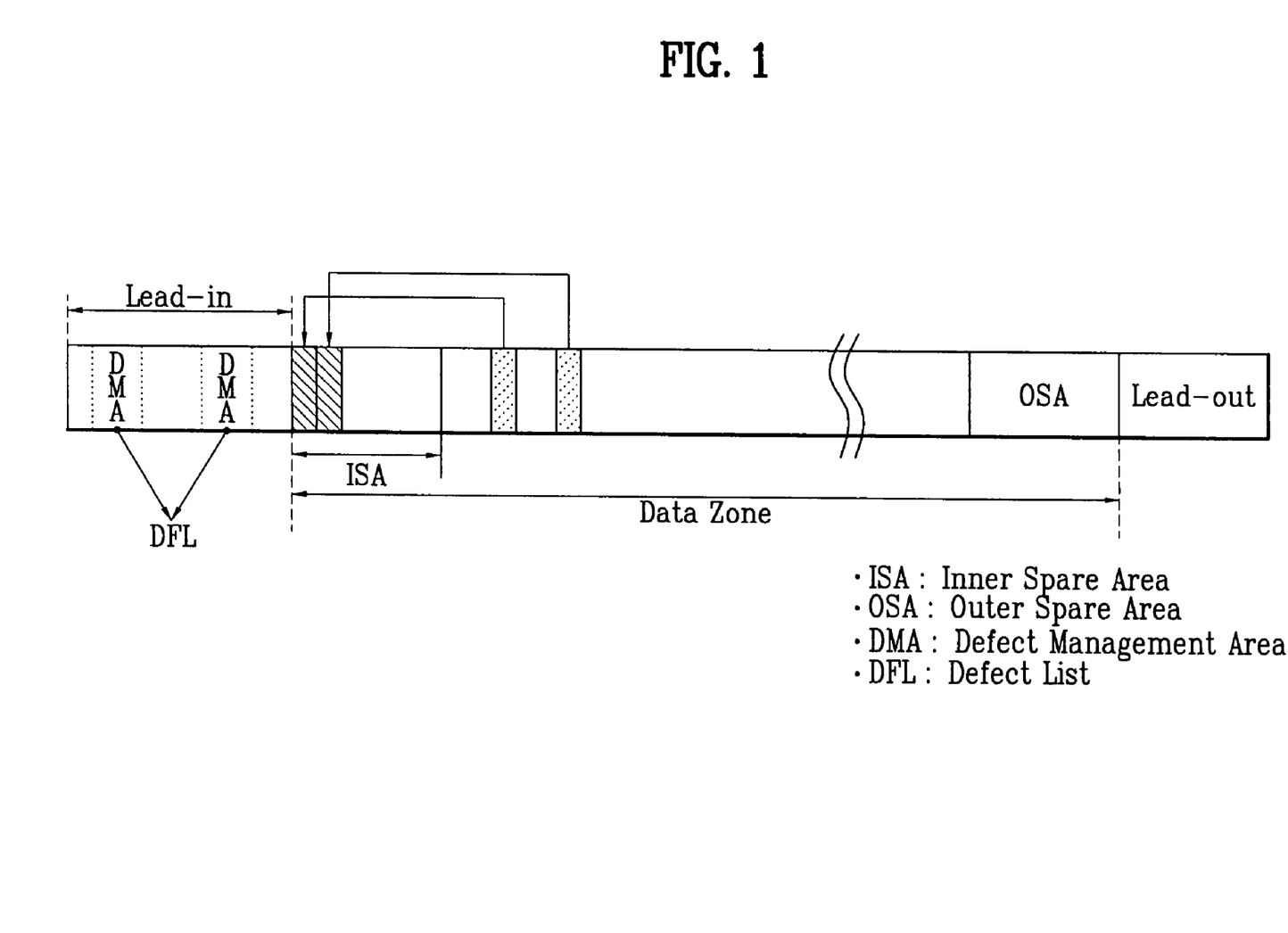
FIG. 1 shows a structure of a general BD-RE and a method for managing defects of the BD-RE.

FIG. 1 shows a structure of a general BD-RE and a method for managing defects of the BD-RE.

As shown in FIG. 1, the BD-RE includes a Lead-in zone, a data zone, and a Lead-out zone. The data zone includes an Inner Spare Area (ISA) and an Outer Spare Area (OSA). The ISA is located at the front end of the data zone, and the OSA is located at the rear end of the data zone.

The BD-RE records data in cluster units, each of which corresponds to a predetermined record unit. In this case, the BD-RE disc determines the presence or absence of a defect area in the data zone when data is recorded in cluster units.

If the defect area is detected, data to be recorded in the defect area is recorded in the aforementioned spare area, for example, the ISA, instead of the defect area, and at the same time position information associated with the defect area and position information recorded in the aforementioned spare area are recorded in a defect list contained in the Lead-in area.

Therefore, since data to be recorded in the defect area is recorded in the spare area instead of the defect area, data recorded in the spare area instead of the defect area can be read/reproduced, such that the BD-RE can prevent the occurrence of unexpected errors generated when the data is recorded/reproduced.

In the meantime, there has recently been developed a write-once optical disc such as a Blu-ray Disc Recordable (BD-R). The BD-R can physically record data only once throughout the whole area, such that it cannot physically overwrite data therein, differently from the BD-RE.

However, since a user may desire to edit or correct data recorded in the BD-R, the BD-R may require a data overwrite function for the convenience of the user or a host. As a result, there must be developed an effective method for allowing the BD-R to execute the aforementioned data overwrite function.

SUMMARY OF THE INVENTION

Accordingly, the present invention is directed to a recording medium, and a method and apparatus for overwriting data in the same that substantially obviate one or more problems due to limitations and disadvantages of the related art.

An object of the present invention is to provide a method and apparatus for overwriting data in a recording medium.

Another object of the present invention is to provide a method and apparatus for logically overwriting data in a write-once recording medium.

Still another object of the present invention is to provide a recording medium for use in the aforementioned method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for overwriting data in a recording medium comprises the steps of: a) assigning a plurality of record areas to the recording medium, and recording the same category data in individual record areas; and b) performing a replacement record operation at a specific position indicative of a closest writable area, upon receiving an overwrite command, and maintaining the same category data in the record area after performing the replacement record operation.

In another aspect of the present invention, there is provided a method for overwriting data in a recording medium comprising the steps of: a) assigning at least one Sequential Recording Range (SRR) to the recording medium, and recording data in the assigned SRR; b) upon receiving an overwrite command associated with a pre-recorded area contained in the SRR, performing a replacement record operation in a writable area contained in the SRR; and c) if the writable area is not present in the SRR, performing a replacement record operation in a writable area contained in an adjacent SRR.

In still another aspect of the present invention, there is provided an apparatus for recording/reproducing data in/from a recording medium comprising: a microprocessor for assigning a plurality of record areas to the recording medium, recording the same category data in individual record areas, performing a replacement record operation at a specific position indicative of a closest writable area upon receiving an overwrite command associated with the data record areas, and maintaining the same category data in at least one record area after performing the replacement record operation; and a pickup unit for receiving a control signal from the microprocessor, and recording data in the recording medium according to the received control signal.

In still another aspect of the present invention, there is provided a recording medium comprising: a data zone to which a plurality of sequential recording ranges (SRRs) can be assigned; and a management area, wherein each of the SRRs assigned to the data zone receives an overwrite command associated with a pre-recorded area contained in the SRR, enables data to be recorded in a writable area contained in the SRR instead of the pre-recorded area, and enables data to be recorded in a writable area contained in an adjacent SRR when there is no writable area in the SRR, and the management area records management information generated by the overwrite command.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Preferred embodiments of the present invention will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, a magnetic disc, and a magnetic tape, etc.

For the convenience of description and better understanding of the present invention, a write-once optical disc (i.e., a BD-R) will hereinafter be exemplarily used as the above-mentioned recording medium in the present invention.

Figure 2:
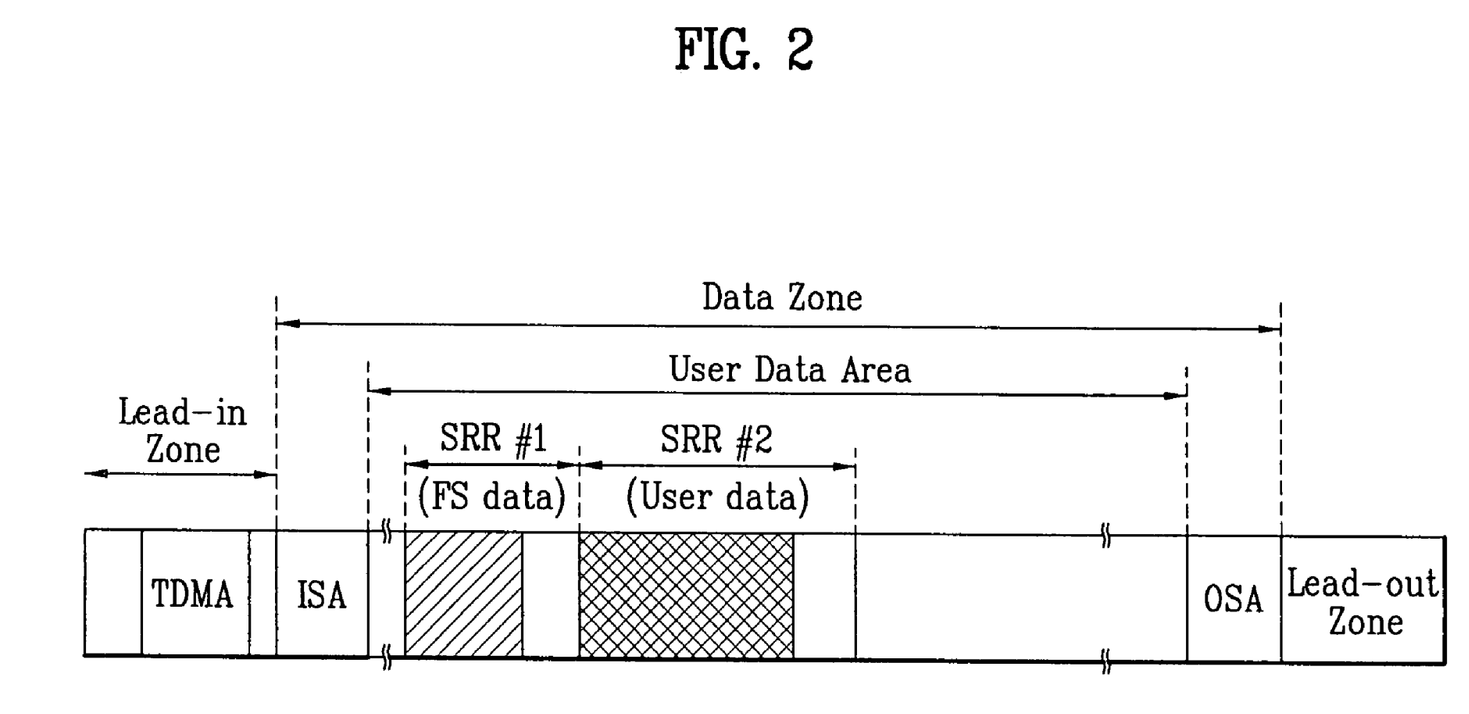
FIG. 2 shows a method for recording data in a write-once optical disc (i.e., a BD-R)

FIG. 2 shows a method for recording data in the write-once optical disc (i.e., a BD-R).

Referring to FIG. 2, the BD-R includes a Lead-in zone, a data zone, and a Lead-out zone. The data zone includes an Inner Spare Area (ISA), an Outer Spare Area (OSA), and a user data area for storing actual user data therein. The ISA is located at the front end of the data zone, and the OSA is located at the rear end of the data zone.

The Lead-in zone records various management information required for recording/reproducing data in/from the optical disc. Specifically, the Lead-in zone further includes a Temporary Disc Management Area (TDMA) in which defect management information and record management information of the optical disc are recorded.

The TDMA is adapted to update the aforementioned defect- and record-management information frequently generated when the optical disc is used. An additional TDMA may also be assigned to the aforementioned spare area as necessary.

The aforementioned write-once optical disc (i.e., the BD-R) uses two data record methods, i.e., a Sequential Recording Mode (SRM) method, and a Random Recording Mode (RRM) method.

The SRM method divides the user data area storing actual user data into a plurality of successive areas, such that data can be easily recorded in the disc. Each of the aforementioned divided areas is referred to as a track or an SRR (Sequential Recording Range). The divided area will hereinafter be referred to as an SRR in the present invention.

The data record for use in the SRR is achieved in a non-recorded cluster indicative of the next writable non-recorded cluster. An address of the non-recorded cluster is called a Next Writable Address (NWA). In other words, a cluster next to a pre-recorded area contained in the SRR acts as the NWA, and the data record operation begins at the NWA. Therefore, if data is successively recorded from a specific position (i.e., the NWA), the NWA is dynamically increased by the data record operation.

In this case, the SRR in which data can be recorded due to the presence of the NWA is referred to as a reserved SRR or an open SRR. For the convenience of description, the SRR is referred to as the open SRR in the present invention.

Two or more open SRRs are assigned to perform a data record operation. One SRR is used as a file system data area for storing information associated with user data, and the other SRR is used as a user data area in which user data is recorded.

The file system data is indicative of name information of files contained in the disc and disc record position information, such that it can enable a user data file to be recorded/reproduced in/from the disc. In other words, a host or an application records or reproduces a specific file contained in the disc using the aforementioned file system data.

Therefore, the above-mentioned file system data includes name information of hierarchical file/directory, and pointer information indicative of size/position data of the above file/directory.

Upon receiving a request of an application or host according to the above-mentioned SRM method, an overwrite command associated with a pre-recorded area contained in a single SRR may occur. In this case, a disc record operation can be physically performed only once due to characteristics of the BD-R, such that a data record operation associated with the pre-recorded area, i.e., an overwrite function, is not allowed. However, data to be recorded in the above pre-recorded area can be recorded in the NWA contained in the next writable user data area, instead of the pre-recorded area. The above-mentioned replacement record operation is called a logical overwrite operation different from a physical overwrite operation of a BD-RE.

The above-mentioned logical overwrite method will hereinafter be described with reference to the annexed drawings.

Figure 3:
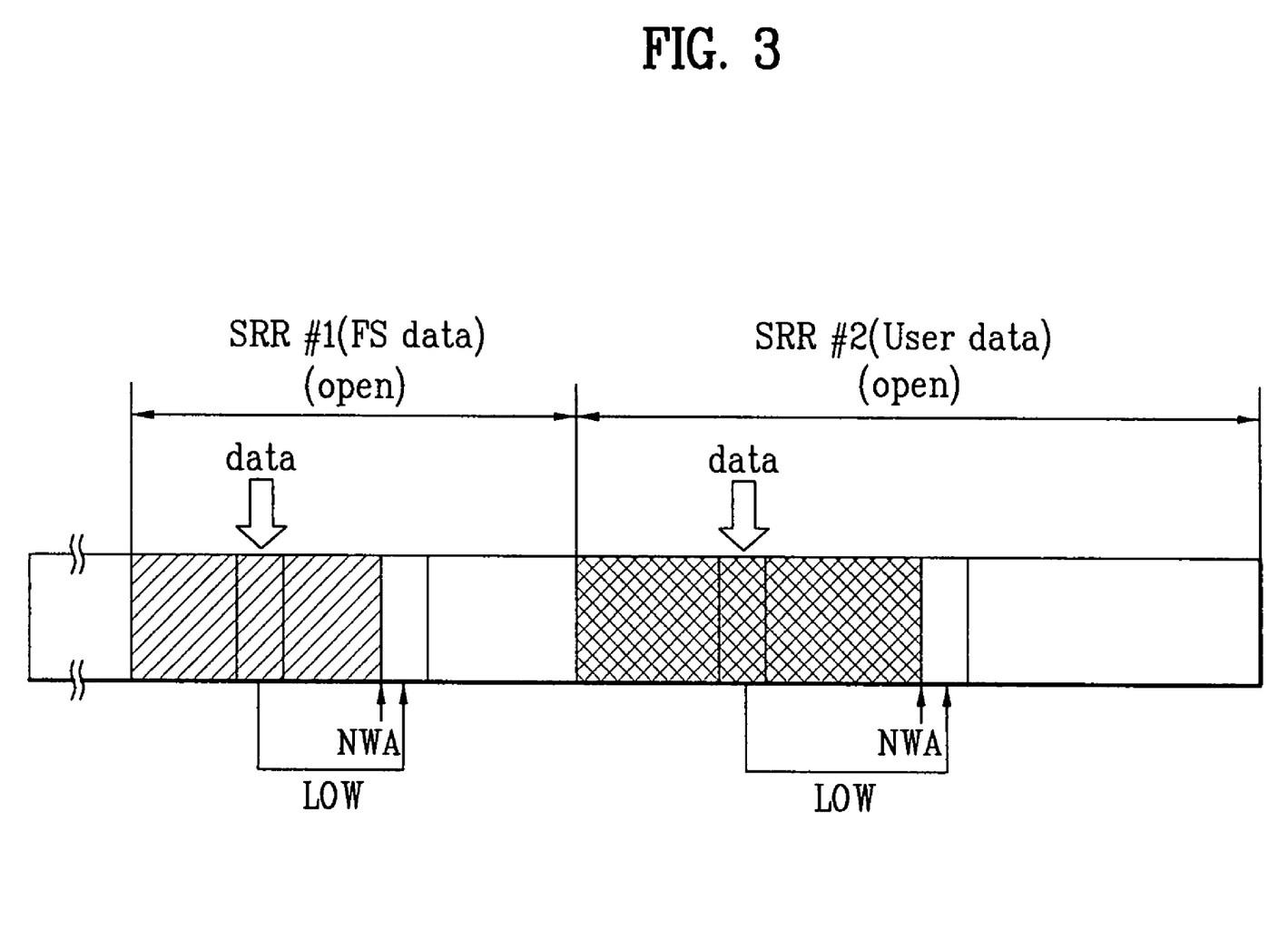
FIG. 3 shows a method for logically overwriting data in a BD-R in accordance with a first preferred embodiment of the present invention.

FIG. 3 shows a method for logically overwriting data in a BD-R in accordance with a first preferred embodiment of the present invention.

Referring to FIG. 3, upon receiving a data record command associated with a pre-recorded area contained in a single SRR, data to be recorded in the pre-recorded area is recorded in the NWA indicative of the next writable area, instead of the pre-recorded area.

In more detail, if an FS data area of an SRR #1 acts as an open SRR due to the presence of the NWA, data is recorded in the NWA contained in the SRR #1. If a user data area of an SRR #2 acts as an open SRR due to the presence of the NWA, data is recorded in the NWA contained in the SRR #2.

According to the present invention, if a data record command associated with a pre-recorded area contained in the write-once optical disc (i.e., BD-R) occurs (i.e., an overwrite command occurs), data is recorded in an NWA closest to an area at which the overwrite command is received, instead of the pre-recorded area.

Therefore, as can be seen from FIG. 3, if a single SRR includes an NWA, the SRR acts as an open SRR. If the SRR has enough space to store desired data, the data is firstly recorded in a corresponding SRR (i.e., a replacement record operation associated with the corresponding SRR is performed).

If the replacement record operation is performed as stated above, first position information of an area at which an overwrite command of the data is received, and second position information of the other area at which the replacement record operation is performed are recorded in a specific area of the disc. For example, the first position information and the second position information are recorded as a LOW entry in a disc TDMA.

The above-mentioned position information can be denoted by a first Physical Sector Number (PSN) of a corresponding cluster. Preferably, if the logical overwrite operation satisfies size information of a plurality of clusters, a first PSN of a first cluster and a first PSN of the last cluster may be recorded using two entries, respectively.

Therefore, if a user desires to reproduce data of a first area receiving the overwrite command with reference to LOW entry information recorded in the TDMA, data stored in a second area at which a data replacement record operation is performed is reproduced, instead of data stored in the first area.

Therefore, although data to be recorded in the first area receiving the overwrite command is physically recorded in the second area acting as a replacement area, an actual host recognizes that data is overwritten in the first area receiving the overwrite command.

When performing the above-mentioned logical overwrite command, a replacement record area where a replacement record operation associated with the logical overwrite command is performed may be insufficient for the replacement record operation, and a detailed description thereof will hereinafter be described with reference to FIG. 4.

In more detail, the replacement record operation performed by the overwrite command is firstly performed in a corresponding SRR. However, if an area required for the replacement record operation is not contained in the corresponding SRR, it is preferable that data is recorded in another SRR adjacent to the corresponding SRR.

Figure 4:
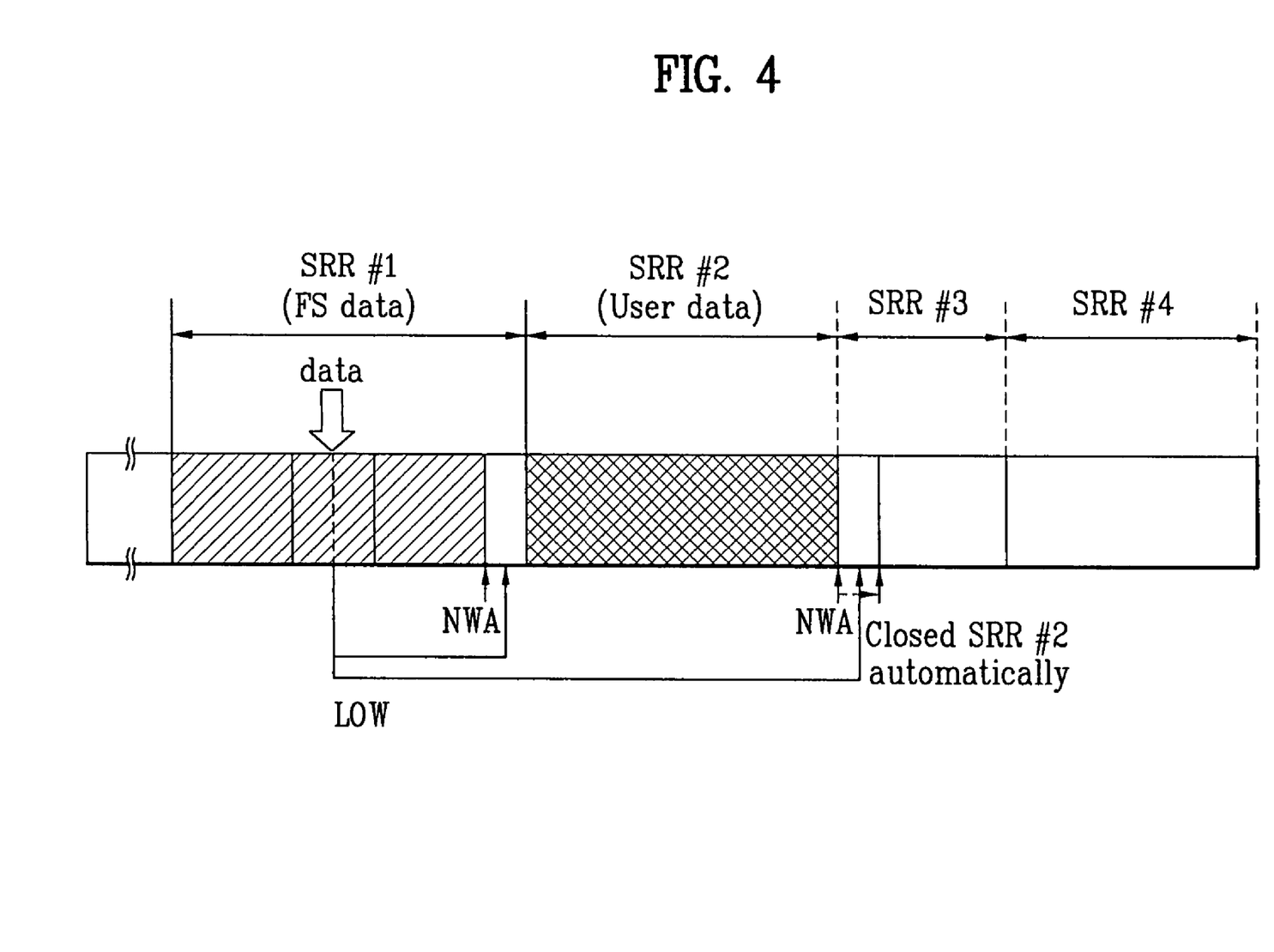
FIG. 4 shows a method for logically overwriting data in a BD-R in accordance with a second preferred embodiment of the present invention.

FIG. 4 shows a method for logically overwriting data in a BD-R in accordance with a second preferred embodiment of the present invention.

As can be seen from FIG. 4, a data overwrite command associated with a pre-recorded area of an SRR #1 may be received in the SRR #1 in which file system (FS) data is recorded. In this case, if the SRR #1 acts as an open SRR due to the presence of the NWA, the replacement record operation is performed in the NWA.

When performing the above-mentioned replacement record operation, a replacement record area may be insufficient for the aforementioned replacement record operation.

In this case, a replacement record operation of data is performed several times corresponding to the remaining areas of the SRR #1, the remaining data whose replacement record operation is not performed is recorded in an NWA of an adjacent SRR. In other words, some data is recorded in the NWA of the SRR #1, and the remaining data is recorded in an NWA of another SRR adjacent to the SRR #1. FIG. 4 exemplarily shows the replacement record operation performed in the SRR #2.

In this case, the SRR #2 in which the replacement record operation of the remaining data is performed may be indicative of a user data area. In this case, it is desirable that the same data be recorded in a single SRR. Preferably, the SRR #2 storing the user data is closed, a new SRR is assigned, and data is recorded in the new SRR.

For example, data of the SRR #1 is indicative of file system data. Therefore, if file system data is recorded in the SRR #2 in which user data different from the file system data is recorded, the SRR #2 is automatically closed, a new SRR is assigned, and data is recorded in the new SRR.

Therefore, the SRR #2 storing the user data is closed, and the new SRR #3 is assigned, such that the remaining file system data for the logical overwrite operation is recorded in the SRR #3.

As a result, user data is recorded in the SRR #2, and file system data is recorded in the SRR #3, such that the above data record operations can prevent different data units caused by the logical overwrite command from being recorded in a single SRR.

Thereafter, if the user desires to re-record the user data in the disc, a new SRR #4 is assigned to the disc, such that the user data is recorded in the SRR #4.

The above-mentioned logical overwrite operation is generated from an optical disc drive. In more detail, although an optical disc is actually equal to a BD-R, an application or host can be freely applied to the BD-R as if the BD-R were the BD-RE, irrespective of a pre-recorded area of the BD-R.

Therefore, if the logical overwrite operation is performed, the application or host does not recognize that the Next Writable Area (NWA) is changed to another area due to the occurrence of the aforementioned logical overwrite operation.

Therefore, the file system can cope with a specific case in which the NWA is changed to another NWA due to the execution of the overwrite operation. In more detail, if the file system desires to perform a data record operation, it queries the optical disc drive for position information of the Next Writable Area (NWA), and allows data to be recorded in the changed NWA corresponding to the position information.

In the meantime, the newly-assigned SRRs (i.e., SRRs #3 and #4) are formed by the division of the SRR #2 for initially-assigned user data.

Although the second preferred embodiment of the present invention exemplarily shows a specific case in which an insufficient replacement record area is provided when a logical overwrite operation is performed in the SRR including File System (FS) data, it is obvious to those skilled in the art that the logical overwrite operation can be performed in a closed SRR, all areas of which are filled with the File System (FS) data.

Figure 5:
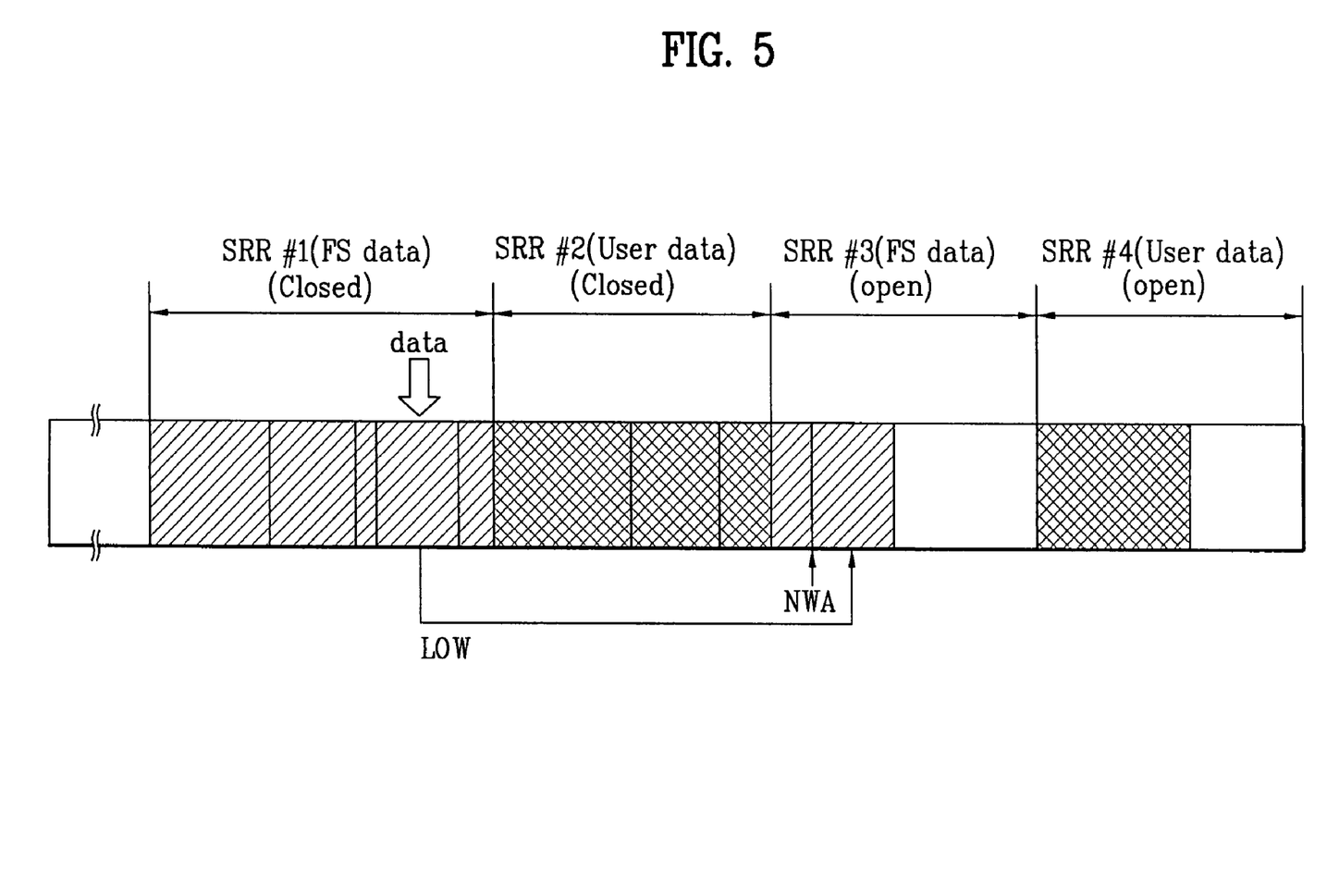
FIG. 5 shows a method for logically overwriting data in a BD-R in accordance with a third preferred embodiment of the present invention.

FIG. 5 shows a method for logically overwriting data in a BD-R in accordance with a third preferred embodiment of the present invention.

As can be seen from FIG. 5, according to the third preferred embodiment of the present invention, when a file system data area of the SRR #1 is filled with data such that the SRR #1 is closed, a record command associated with new file system data is applied to the closed SRR #1.

In this way, if a record command associated with a pre-recorded area is applied to the SRR #1, data to be recorded in the pre-recorded area (i.e., the SRR #1) is recorded in an NWA closest to the pre-recorded area (i.e., the SRR #1), instead of the pre-recorded area (i.e., the SRR #1).

Therefore, data is recorded in the SRR #3 including the closest NWA, instead of the SRR #1. In this case, since the SRR #3 is indicative of an area in which file system data is recorded, the same data as that of the SRR #1 is recorded in the SRR #3, such that data is immediately recorded in the NWA of the SRR #3 without closing the SRR.

In association with the disc where the replacement record operation is performed, a method for logically overwriting data in a closed SRR or an SRR in which user data including an insufficient replacement record area is recorded will hereinafter be described with reference to FIG. 6.

Figure 6:
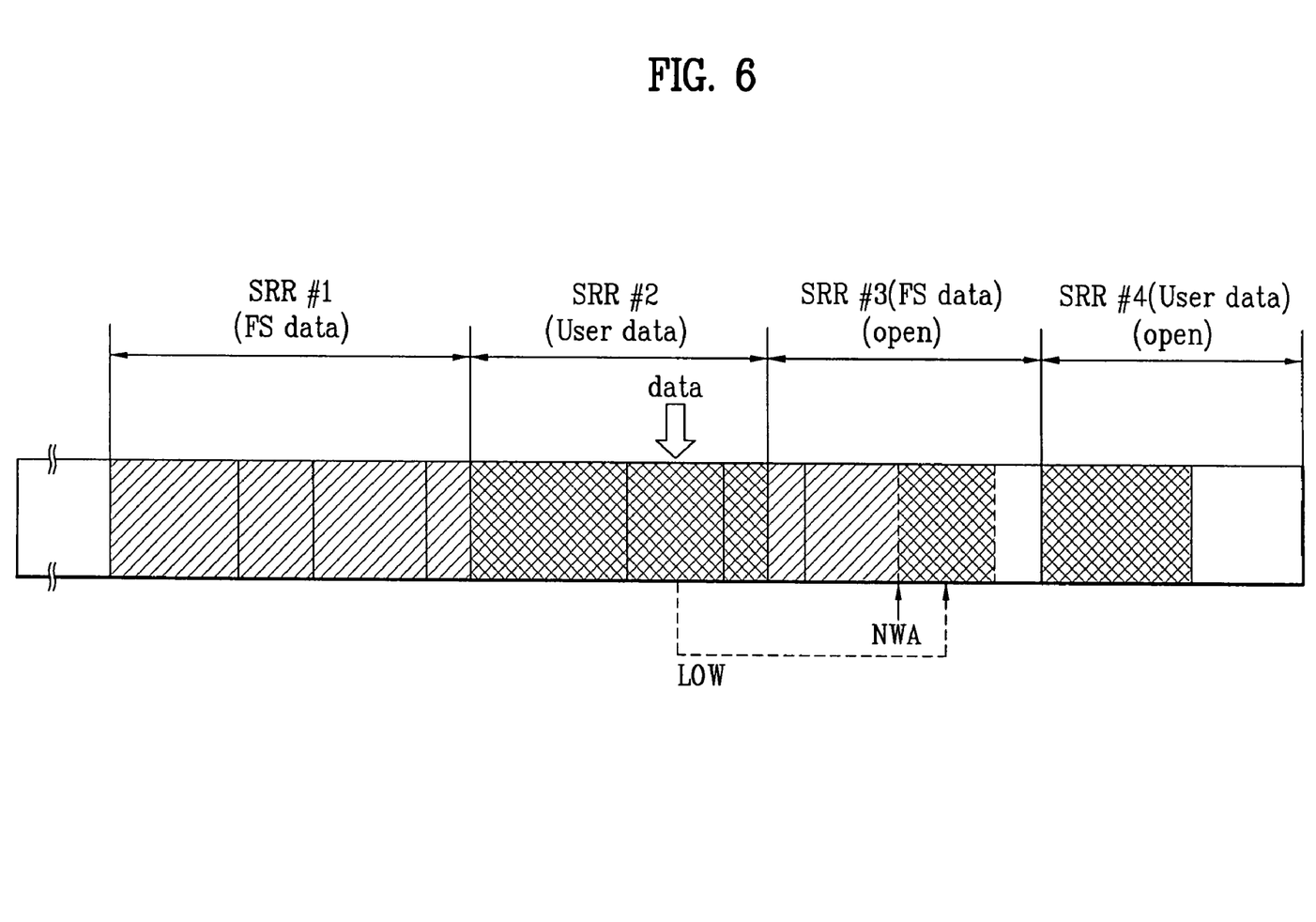
FIG. 6 shows a method for logically overwriting data in a BD-R in accordance with a fourth preferred embodiment of the present invention.

FIG. 6 shows a method for logically overwriting data in a BD-R in accordance with a fourth preferred embodiment of the present invention.

As can be seen from FIG. 6, if the SRR #2 including user data is filled with data such that it is closed, or if the SRR #2 has an insufficient replacement record area, a record command of new data may be transmitted to the SRR #2.

In this case, data to be recorded in the SRR #2 is recorded in the closest NWA. In other words, the data is recorded in the NWA present in the SRR #3 closest to the SRR #2.

In this case, the SRR #3 records file system data therein. Therefore, if the logical overwrite operation is performed in the SRR #3 as shown in the aforementioned preferred embodiments, different data units are mixed in the SRR #3. In more detail, it is desirable that the same data be recorded in a single SRR, but different data units are actually present in the single SRR due to the occurrence of the logical overwrite operation.

In order to solve the above-mentioned problem, it is desirable that user data be sequentially recorded. In more detail, although the logical overwrite operation can be performed in all areas of the BD-R, only a sequential recording operation is performed in general user data generated by the file system.

The optical disc according to the present invention includes the "List of Open SRR" field of a Sequential Recording Range Information (SRRI) header including information associated with an open SRR, such that it can easily perform the logical overwrite operation on the closed SRR storing user data using the "List of Open SRR" field, and can prevent different data units from being recorded in a single SRR using the "List of Open SRR" field. A detailed description thereof will hereinafter be described with reference to FIG. 7.

Figure 7:
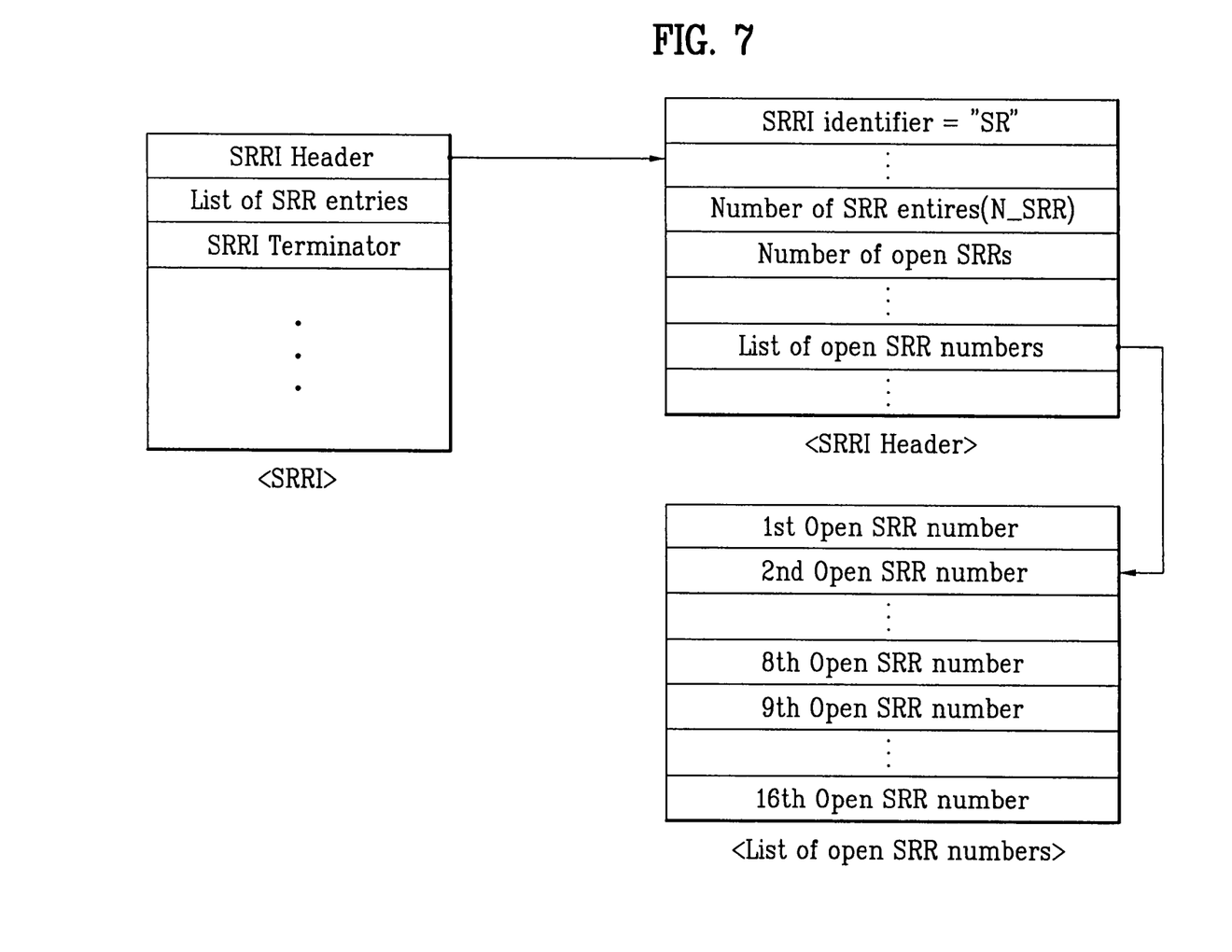
FIG. 7 is a structural diagram illustrating Sequential Recording Range Information (SRRI) based on a Sequential Recording Mode (SRM) method for use in the BD-R according to the present invention.

FIG. 7 is a structural diagram illustrating the SRRI based on an SRM method for use in the BD-R according to the present invention. In more detail, a logical overwrite method according to a fifth preferred embodiment of the present invention is shown in FIG. 7.

Referring to FIG. 7, the SRRI is indicative of information recorded in a TDMA of the optical disc. The SRRI includes a "List of SRR entries" field and a "SRRI Terminator" field.

The "SRRI header" field includes a "SRRI identifier='SR'" field as ID (Identification) information indicative of the SRRI. Also, the "SRRI header" field includes a "number of SRR entries" field, a "number of Open SRRs" field, and a "List of Open SRR numbers" field.

Information indicative of the number of SRR entries is recorded in the "number of SRR entries" field. Information indicative of the number of open SRRs is recorded in the "number of Open SRRs" field. Information indicative of the list of open SRR numbers is recorded in the "List of Open SRR numbers" field.

The information associated with the list of the open SRR numbers is recorded in the "List of Open SRR numbers" field. As can be seen from FIG. 7, each of 16 open SRR number field from a first open SRR number field to a 16th open SRR number field is assigned two bytes, such that each SRR number field record data therein.

In this case, the aforementioned SRR numbers are assigned in descending numerical order. If the number of assigned SRRs is less than 16, data of 0 is recorded in individual unused open SRR number fields. Therefore, the optical disc drive searches for a replacement recordable SRR by referring to the "List of Open SRR numbers" field.

According to the present invention, when the logical overwrite operation is performed in the closed SRR using the above-mentioned SRRI header information, the logical overwrite operation is performed to prevent different data units from being present in a single SRR, and a detailed description thereof will hereinafter be described with reference to FIG. 8.

Figure 8:
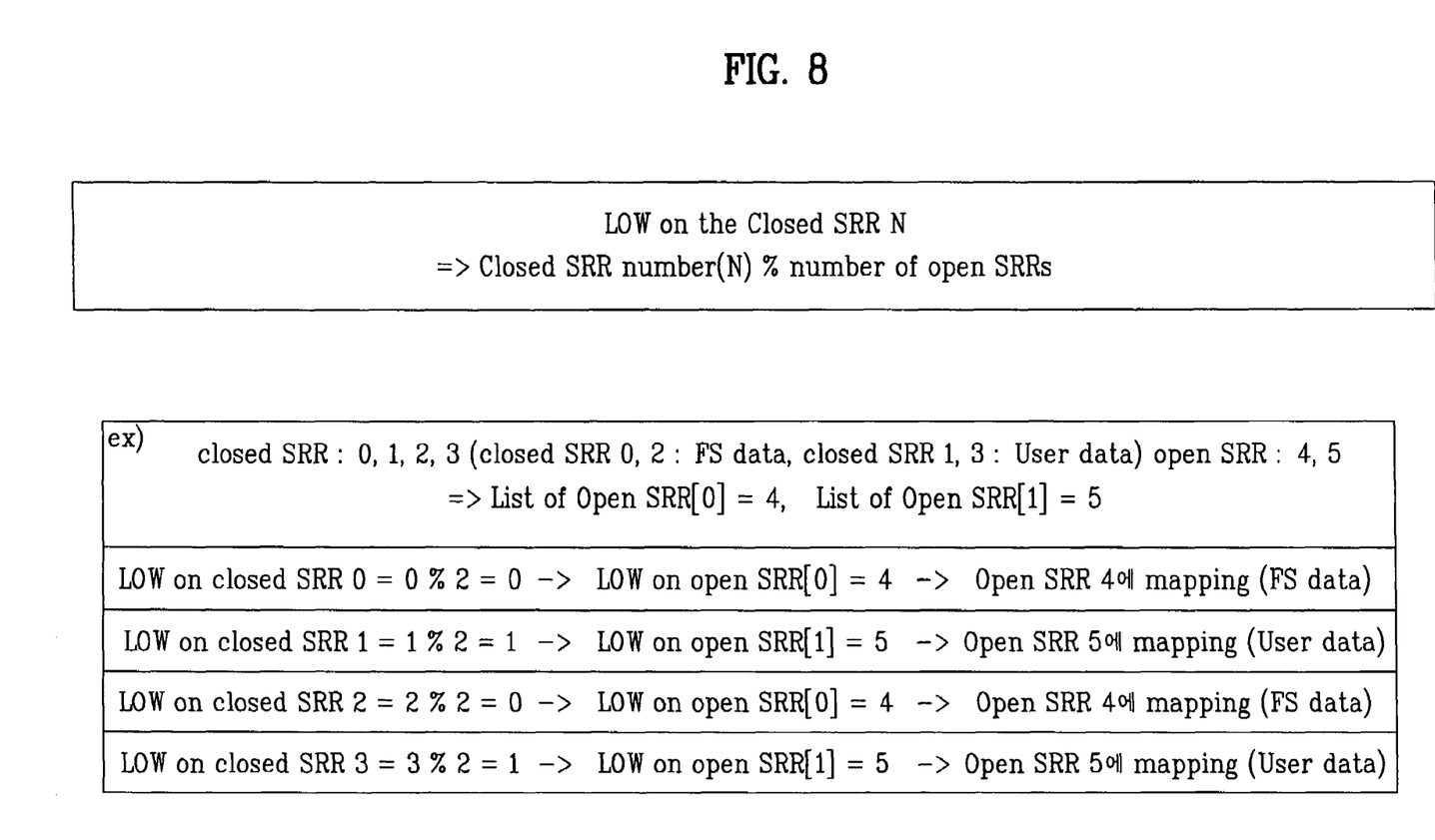
FIG. 8 shows a method for logically overwriting data in a BD-R in accordance with a fifth preferred embodiment of the present invention.

FIG. 8 shows a method for logically overwriting data in a BD-R in accordance with a fifth preferred embodiment of the present invention.

Referring to FIG. 8, if the optical disc drive desires to perform the logical overwrite operation on a pre-recorded SRR or an SRR closed by a user request, the closed SRR number is recorded in the NWA of the open SRR corresponding to a remainder acquired when the closed SRR number is divided by the number of open SRRs.

For example, as shown in FIG. 8, it is assumed that the closed SRRs are 0th, 1st, 2nd, and 3rd SRRs (i.e., SRR 0, SRR 1, SRR 2, and SRR 3), file system data is recorded in the aforementioned closed SRR 0 and SRR 2, and user data is recorded in the aforementioned closed SRR 1 and SRR 3. If the open SRRs are 4-th and 5-th SRRs, the "List of Open SRR Numbers" field stores "List of Open SRR[0]=4" information and "List of Open SRR[1]=5" information.

In this case, parenthesized characters of the "List of Open SRR" information are indicative of a 0th open SRR and a first open SRR because the number of assigned open SRRs is 2.

Under the above-mentioned record state, if the optical disc drive desires to perform the logical overwrite operation in the SRR 0 closed by a request of the host or application, the number of open SRRs is 2, such that a remainder acquired when the closed SRR number "0" is divided by 2 is calculated.

Since the calculated remainder is equal to 0, a replacement record operation for the logical overwrite operation is performed in the NWA of the 0-th open SRR (i.e., the open SRR 4 having the open SRR number of 4). In this case, the closed SRR 0 is indicative of an SRR including file system data, such that the file system data is also recorded in the open SRR 4 in which the replacement record operation is performed.

If the logical overwrite command is transmitted to the closed SRR 1, a remainder acquired when the closed SRR number "1" is divided by the number of open SRRs (i.e., 2) is calculated.

Since the calculated remainder is equal to 1, a replacement record operation for the logical overwrite operation is performed in the NWA of the first open SRR (i.e., the open SRR 5 having the open SRR number of 5). In this case, the closed SRR 1 is indicative of an SRR including user data, such that the user data is also recorded in the open SRR 5 in which the replacement record operation is performed.

In this way, if the optical disc drive desires to perform the logical overwrite operation in the closed SRR 2, the replacement record operation is performed in the open SRR 4. The open SRR 4 is indicative of an SRR including file system data. Although a replacement record operation for the logical overwrite operation associated with the closed SRR 2 storing the file system data is performed, different data units are not present in the same SRR.

If the optical disc drive desires to perform the logical overwrite operation on the closed SRR 3, the replacement record operation is performed in the open SRR 5. Since the open SRR 5 and the closed SRR 3 record user data therein, the same data may be present in a single SRR.

A method for recording data in the BD-R according to the present invention will hereinafter be described with reference to FIG. 9.

Figure 9:
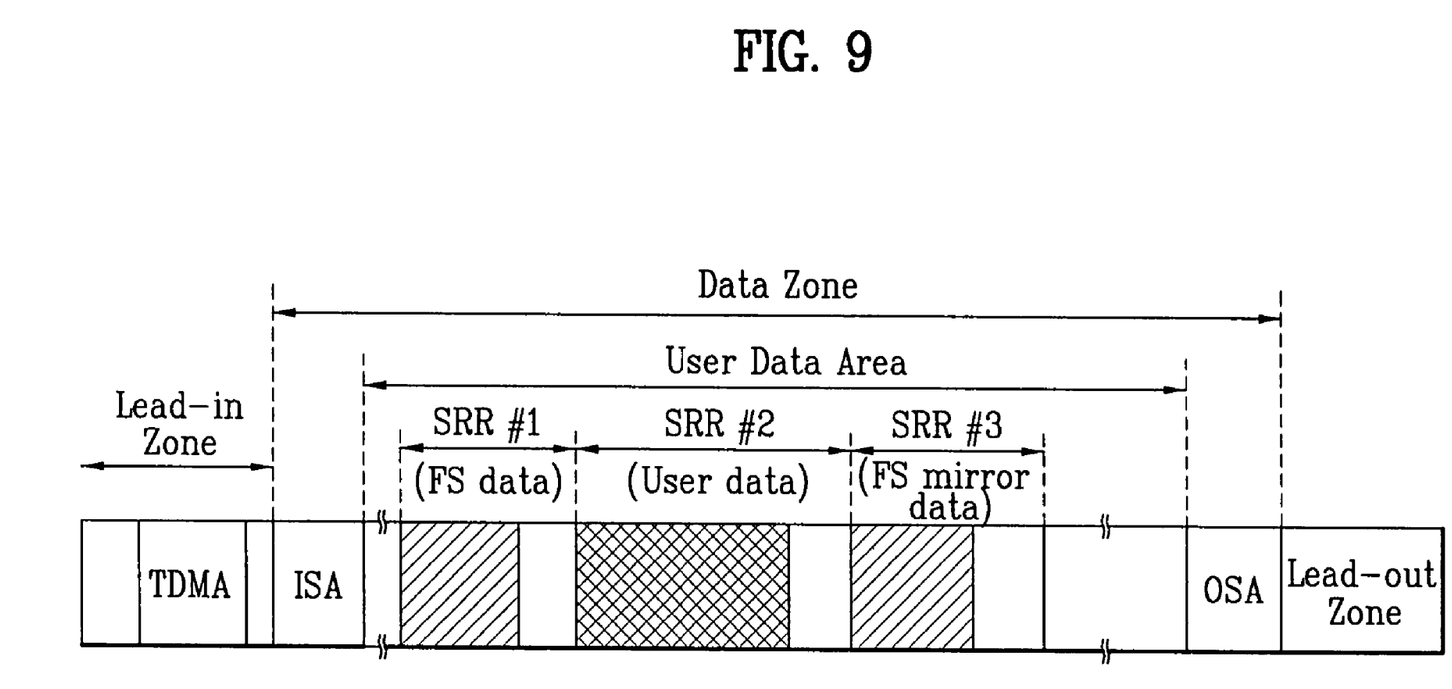
FIG. 9 shows a method for recording data in a BD-R according to the present invention.

FIG. 9 shows a method for recording data in the BD-R according to the present invention. Referring to FIG. 9, the BD-R includes a Lead-in zone, a data zone, and a Lead-out zone. Two or more SRRs are assigned to the data zone, such that desired data can be recorded in the data zone.

In this case, three SRRs (i.e., first to third SRRs) are simultaneously assigned to the data zone as shown in FIG. 9. The first SRR records file system data, the second SRR records user data, and the third SRR records file system (FS) mirror data equal to the aforementioned file system data.

The file system mirror data is equal to the file system data, and is adapted to more stably preserve the file system data indicative of the principal data.

If the logical overwrite operation is performed even when data is recorded in the three SRRs while being classified according to the three SRRs, it is obvious to those skilled in the art that the logical overwrite operation can be performed to prevent different data units from being present in a single SRR.

Figure 10:
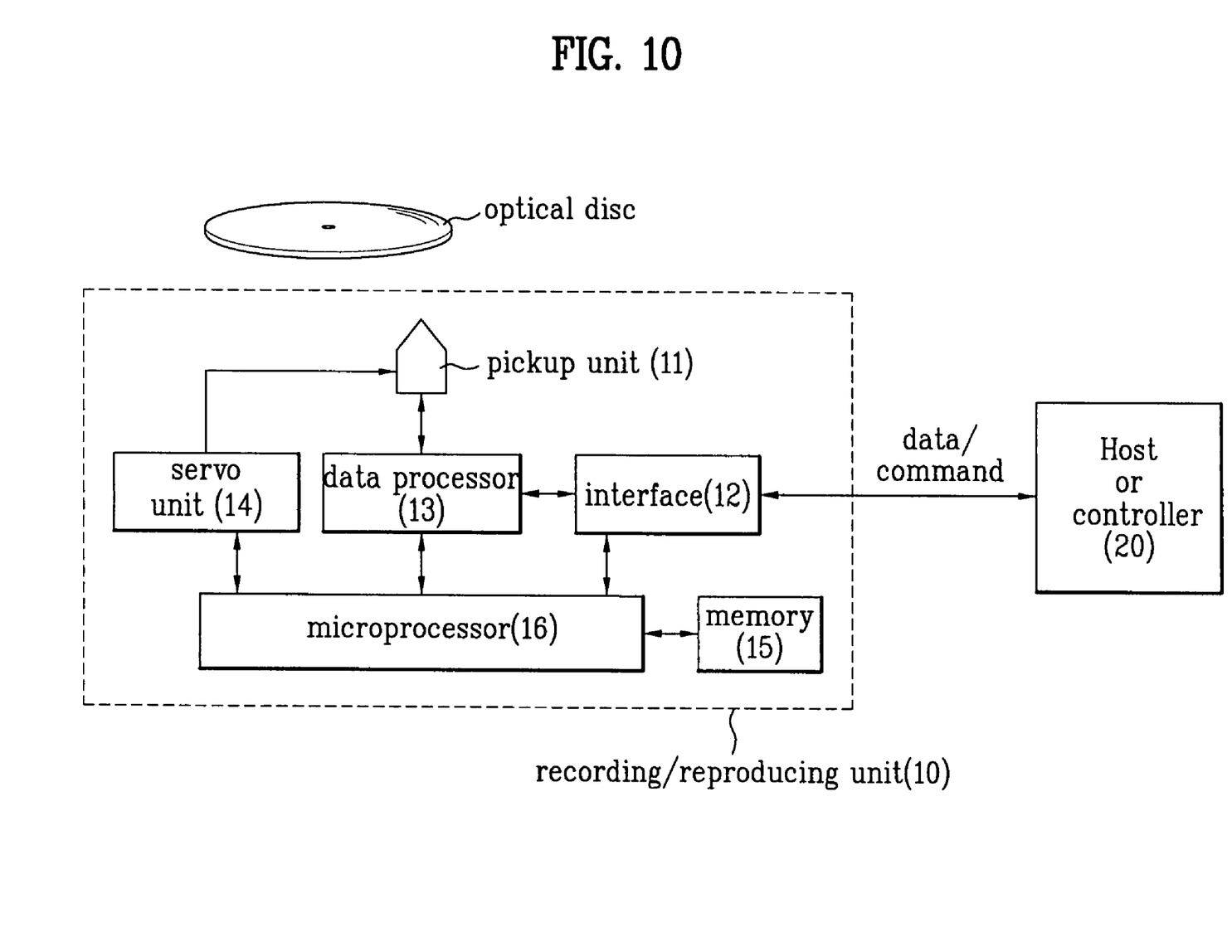
FIG. 10 is a block diagram illustrating an optical recording/reproducing apparatus according to the present invention.

FIG. 10 is a block diagram illustrating an optical recording/reproducing apparatus according to the present invention.

Referring to FIG. 10, the optical recording/reproducing device includes a recording/reproducing unit 10, and a host or controller 20 for controlling the recording/reproducing unit 10. The recording/reproducing unit 10 may also be referred to as an optical disc drive, such that it should be noted that the recording/reproducing unit 10 is also called the optical disc drive in the present invention as necessary.

According to the above-mentioned optical recording/reproducing device, the host 20 transmits a record/reproduction command associated with a specific area of the optical disc to the recording/reproducing unit 10, and the recording/reproducing unit 10 performs the record/reproduction operations according to the command of the host 20.

In this case, the recording/reproducing unit 10 includes an interface unit 12, a pickup unit 11, a servo unit 14, a data processor 13, a memory 15, and a microprocessor 16. The interface unit 12 communicates with the host 20, such that it can transmit/receive data and commands to/from the host 20. The pickup unit 11 directly records/reproduces data in/from the optical disc. The data processor 13 receives a signal from the pickup unit 11, restores the received signal to a desired signal value, or modulates a signal to be recorded into another signal recorded in the optical disc, such that it transmits the restored or modulated result. The servo unit 14 controls operations of the pickup unit 11, such that it can correctly read a signal from the optical disc, or can correctly record a signal in the optical disc. The memory 15 temporarily stores various information including management information and other data. The microprocessor 16 controls mutual operations of the above-mentioned components contained in the above-mentioned recording/reproducing unit 10.

A method for recording data in the BD-R using the aforementioned optical recording/reproducing device according to the present invention will hereinafter be described.

If the optical disc (i.e., the BD-R) is seated in the optical recording/reproducing device, all management information is read from the BD-R, the read management information is stored in the memory 15, and the above-mentioned management information is used when data is recorded/reproduced in/from the optical disc.

In this case, if a user desires to record data in a specific area of the optical disc and enters a record command, the host 20 receives the record command from the user, and transmits both desired record position information and data to be recorded to the recording/reproducing unit 10.

In this case, the microprocessor 16 contained in the recording/reproducing unit 10 receives the record command, and records data in the optical disc according to the record command.

If the overwrite operation must be performed when data is recorded in the optical disc, data to be recorded in the overwrite area is recorded in the Next Writable Area (NWA) of the user data area using a variety of methods shown in the preferred embodiments, and position information of the data is recorded as LOW entry information in the TDMA.

For the above-mentioned record operation, the microprocessor 16 contained in the recording/reproducing unit 10 transmits position information of the replacement record area and data to the servo unit 14 and the data processor 13, such that a record operation or a replacement record operation can be terminated at a desired position contained in the disc through the use of the pickup unit 11.

A method for reproducing data from the write-once optical disc (i.e., the BD-R) will hereinafter be described.

If the BD-R is seated in the optical recording/reproducing device, all management information is read from the BD-R, the read management information is stored in the memory 15, and the above-mentioned management information is used when data is recorded/reproduced in/from the optical disc.

In this case, if a user desires to reproduce data from a specific area of the optical disc and enters a reproduction command, the host 20 receives the reproduction command from the user, and transmits desired reproduction position information to the recording/reproducing unit 10.

The microprocessor 16 contained in the recording/reproducing unit 10 receives the reproduction command, reads the management information stored in the memory 15, and determines whether an optical disc area desired by the host 20 is replaced with another area contained in the data zone such that desired data is recorded in the replaced area. In more detail, the microprocessor 16 can determine the presence or absence of the replacement record operation by referring to the aforementioned LOW entry information recorded in the TDMA.

The microprocessor 16 can recognize necessary information by referring to either a status bit recorded in a flag bit contained in an address unit of the replacement record area, or a bit including an address of the pre-recorded area.

Therefore, if a replacement record operation is not performed in a reproduction area desired by the host 20, the microprocessor 16 reproduces data of the area corresponding to the reproduction area, and transmits the reproduced information to the host 20. If desired data is recorded in another area instead of the reproduction area desired by the host 20, the microprocessor 16 reproduces data of a corresponding area indicative of a replacement record area by referring to the above-mentioned LOW entry information, and transmits the reproduced data to the host 20.

As apparent from the above description, the present invention provides an effective overwrite method associated with a pre-recorded area of the optical disc, such that desired data can be more effectively recorded/reproduced in/from a write-once optical disc (i.e., a BD-R)

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for overwriting data in a recording medium having a data zone, a lead-in zone, and a lead-out zone, the data zone including a user data area and a spare area, the method comprising:
   dividing the user data area into a plurality of sequential recording ranges, each sequential recording range for successively storing data therein;
   recording data into at least one of the sequential recording ranges; and
   performing a replacement record operation at a next writable area of an open one of the sequential recording ranges by referring to a list of open sequential recording ranges recorded in a temporary disc management area of the recording medium upon receiving an overwrite command to a closed one of the sequential recording ranges, the open sequential recording range having available writable area, and the closed sequential recording range having no available writable area.

2. The method according to claim 1, wherein if non-replaced data remains after the replacement record operation performed in the open sequential recording range, the remaining non-replaced data is recorded from a Next Writable Address (NWA) of another open one of the sequential recording ranges.

3. The method according to claim 2, further comprising:
   if data recorded in the another open one of the sequential recording ranges belongs to a different category from the remaining non-replaced data closing the another open sequential recording range, and assigning a new open sequential recording range in the user data area such that the remaining non-replaced data is recorded in the new open sequential recording range.

4. The method according to claim 1, further comprising:
   recording position information of an area indicated by the overwrite command and position information of a replacement record area replacing the area as a single entry in the temporary disc management area.

5. The method according to claim 1, further comprising:
   recording information associated with the sequential recording ranges in the recording medium as sequential recording range information into the temporary disc management area.

6. The method according to claim 5, wherein the sequential recording range information includes the list of open sequential recording ranges.

7. The method according to claim 1, wherein data recorded in each sequential recording range is classified into one of file system data, user data, and file system mirror data.

8. The method according to claim 1, wherein each of the sequential recording ranges stores therein same category data.

9. An apparatus for recording/reproducing data in/from a recording medium having a data zone, a lead-in zone, and a lead-out zone, the data zone including a user data area and a spare area, the apparatus comprising:
   a pickup configured to record/reproduce data in/from the recording medium;
   a data processor configured to receive a signal from the pickup and restore the received signal, or modulate a signal to be recorded into a signal to be recorded in the recording medium; and
   a servo configured to control the pickup to read a signal from the recording medium;
   a memory configured to temporarily store information and data; and
   a microprocessor configured to control the pickup, the data processor, the servo, and the memory, the microprocessor being further configured to divide the user data area into a plurality of sequential recording ranges, each sequential recording range for successively storing data therein, wherein
   the microprocessor is further configured to control the pickup, data processor, the servo, and the memory so as to record data into at least one of the sequential recording ranges, and the microprocessor is further configured to control the pickup, data processor, the servo, and the memory so as to perform a replacement record operation at a next writable area of an open one of the sequential recording ranges by referring to a list of open sequential recording ranges recorded in a temporary disc management area of the recording medium upon receiving an overwrite command to a closed one of the sequential recording ranges, the open sequential recording range having available writable area, and the closed sequential recording range having no available writable area.

10. The apparatus according to claim 9, wherein if non-replaced data remains after the replacement record operation performed in the open one of the sequential recording ranges, the microprocessor is further configured to control the pickup, the data processor, the servo, and the memory so as to record the remaining non-replaced data starting from a Next Writable Address (NWA) of another open one of the sequential recording ranges.

11. The apparatus according to claim 10, wherein if data recorded in the another open one of the sequential recording ranges belongs to a different category from the remaining non-replaced data, the microprocessor is further configured to control the pickup, the data processor, the servo, and the memory so as to close the another open one of the sequential recording ranges and assign a new open one of the sequential recording ranges to the user data area such that the remaining non-replaced data is recorded in the new open one of the sequential recording ranges.

12. The apparatus according to claim 9, wherein the microprocessor is configured to control the pickup, the data processor, the servo, and the memory so as to record information associated with the sequential recording ranges in the recording medium as sequential recording range information into the temporary disc management area.

13. The apparatus according to claim 12, wherein the sequential recording range information includes the list of open sequential recording range.

14. The apparatus according to claim 9, wherein data recorded in each sequential recording range is classified into one of file system data, user data, and file system mirror data.

15. The method according to claim 9, wherein each of the sequential recording ranges stores therein same category data.

16. A recording medium comprising:
a lead-in zone and a lead-out zone; and
a data zone including a user data area and a spare area, the user data area divided into a plurality of sequential recording ranges, each sequential recording range for successively storing data therein; and
a temporary disc management area storing a list of open sequential recording ranges,
wherein the data zone includes an open one of the sequential recording ranges having a next writable area at which a replacement record operation is performed by referring to the list of open sequential recording ranges upon receiving an overwrite command to a closed one of the sequential recording ranges, the open sequential recording range having available writable area, and the closed sequential recording range having no writable area.

17. The recording medium according to claim 16, wherein if non-replaced data remains after the replacement record operation performed in the one of the open sequential recording ranges, the remaining non-replaced data is recorded from a Next Writable Address (NWA) of another open one of the sequential recording ranges.

18. The recording medium according to claim 17, wherein if data recorded in the another open one of the sequential recording ranges belongs to a different type from the remaining non-replaced data, the another open one of the sequential recording ranges is closed and a new open one of the sequential recording ranges is assigned to the user data area such that the remaining non-replaced data is recorded in the new open one of the sequential recording ranges.

19. The recording medium according to claim 16, wherein data recorded in each sequential recording range is classified into one of file system data, user data, and file system mirror data.

20. The recording medium according to claim 16, wherein each of the sequential recording ranges stores therein same category of data.

* * * * *